United States Patent
Perez

(10) Patent No.: US 6,596,385 B1
(45) Date of Patent: Jul. 22, 2003

(54) ORIENTED MULTI-LAYER POLYMER FILM

(75) Inventor: Karen B. Perez, Pittsford, NY (US)

(73) Assignee: ExxonMobil Oil Corporation, Fairfax, VA (US)

(*) Notice: Subject to any disclaimer, the term of this patent is extended or adjusted under 35 U.S.C. 154(b) by 0 days.

(21) Appl. No.: 09/294,158

(22) Filed: Apr. 19, 1999

(51) Int. Cl.$^7$ .............................................. B32B 27/32
(52) U.S. Cl. ................... 428/213; 428/215; 428/461; 428/515; 428/516; 428/523
(58) Field of Search .................. 428/523, 516, 428/515, 910, 220, 461, 213, 215

(56) References Cited

U.S. PATENT DOCUMENTS

| | | |
|---|---|---|
| 3,753,769 A | 8/1973 | Steiner |
| 4,214,039 A | 7/1980 | Steiner et al. |
| 4,345,005 A | 8/1982 | All et al. |
| 4,377,616 A | 3/1983 | Ashcraft et al. |
| 4,447,494 A | 5/1984 | Wagner, Jr. et al. |
| 4,632,869 A | 12/1986 | Park et al. |
| 4,716,698 A | 1/1988 | Wilson et al. |
| 4,741,950 A | 5/1988 | Liu et al. |
| 4,741,957 A | 5/1988 | Park |
| 4,865,908 A | 9/1989 | Liu et al. |
| 4,961,992 A | 10/1990 | Balloni et al. |
| 5,019,447 A | 5/1991 | Keller |
| 5,057,177 A | 10/1991 | Balloni et al. |
| 5,091,236 A * | 2/1992 | Keller et al. ............... 428/213 |
| 5,254,394 A * | 10/1993 | Bothe et al. ............... 428/212 |
| 5,277,970 A | 1/1994 | Schuhmann et al. |
| 5,326,625 A | 7/1994 | Schuhmann et al. |
| 5,397,635 A | 3/1995 | Wood, Jr. |
| 5,425,996 A * | 6/1995 | Wilkie et al. .............. 428/461 |
| 5,443,915 A | 8/1995 | Wilkie et al. |
| 5,716,698 A | 2/1998 | Schreck et al. |
| 5,972,496 A * | 10/1999 | Bader et al. .............. 428/331 |
| 6,033,771 A * | 3/2000 | Heffelfinger ............ 428/320.2 |
| 6,245,418 B1 * | 6/2001 | Freedman ................. 428/220 |
| 6,291,063 B1 | 9/2001 | Shah et al. |
| 6,461,706 B1 * | 9/2002 | Freedman et al. ......... 428/40.1 |

FOREIGN PATENT DOCUMENTS

| | | |
|---|---|---|
| EP | 545 649 | 6/1993 |
| EP | 665 101 | 8/1995 |

* cited by examiner

Primary Examiner—D. Lawrence Tarazano
(74) Attorney, Agent, or Firm—Rick F. James; Keith A. Bell

(57) ABSTRACT

The invention is directed to an oriented multi-layer polymer film with a core including a thermoplastic polypropylene matrix material. The core is substantially free of cavitations, voids, and fillers. Oriented multi-layer polymer films of the present invention include at least one opaque thermoplastic polymer layer on at least one side of the core which contains an opacifying pigment and at least one thermoplastic polymer skin layer on an outer most side of one of the opaque layer or the core. The film can be economically made, is from about 0.450 mil. to about 2 mils. thick and allows improved processing characteristics such as heat sealing, machinability, while also providing high whiteness, strength and stiffness.

14 Claims, 2 Drawing Sheets

| % Component of Each Layer | % Weight of the Total Weight of the Film | |
|---|---|---|
| 100% HDPE | ~3% | -10 |
| 82% PP+ 18% TiO2 | ~10% | -12 |
| 100% PP | ~74% | -14 |
| 100% PP | ~10% | -16 |
| 100% EPB Terpolymer | ~3% | -18 |

Figure 1.

| % Component of Each Layer | % Weight of the Total Weight of the Film | |
|---|---|---|
| 100% HDPE | ~3% | -10 |
| 82% PP+ 18% TiO2 | ~10% | -12 |
| 100% PP | ~74% | -14 |
| 100% PP | ~10% | -16 |
| 100% EPB Terpolymer | ~3% | -18 |

Figure 2.

| % Component of Each Layer | % Weight of the Total Weight of the Film | |
|---|---|---|
| 100% HDPE | ~3% | -10 |
| 95% PP + 5% TiO2 | ~5-8% | -12 |
| 100% PP | ~78% - 84% | -14 |
| 95% PP + 5% TiO2 | ~5-8% | -15 |
| 100% EPB Terpolymer | ~3% | -18 |

ORIENTED MULTI-LAYER POLYMER FILM

BACKGROUND OF THE INVENTION

The present invention relates to an improved oriented multi-layer polymer film with high opacity, whiteness, and strength that is economically made.

More specifically, the invention relates to an oriented multi-layer polymer film which includes a core made of a polyolefin matrix material, at least one opaque thermoplastic polymer layer on at least one side of the core, and at least one thermoplastic polymer skin layer on the opaque layer.

Oriented multi-layer films of the present invention are widely used in packaging of certain types of foods, such as snack foods like potato chips, cookies and the like. A desirable property in such a packaging film is opacity which protects the packaged product from deterioration caused by exposure to light. In particular, it has been found that certain wavelengths of light, up to about 450 nm cause increased spoilage in such packaged products. In addition, the consumer appears to associate opacity or white coloration with a sanitary product and such white coloration masks oil and grease from the baked item.

Oriented multi-layer opaque films contain at least one layer with pigments or vacuole-inducing particles or a combination thereof, causing the film to have significantly reduced light transmission compared with transparent films. For the purposes of the present invention, "opaque film" means a nontransparent film whose light transparency, measured in accordance with the ASTM D 1003-77, is at most 80%.

Other oriented opaque polymer film compositions are known in the art. U.S. Pat. No. 4,377,616 discloses an opaque biaxially oriented polymer film structure which includes a thermoplastic polymer matrix core possessing numerous voids, a substantial number of which contain at least one spherical void-initiating particle, and transparent thermoplastic skin layers adhering to the surfaces of the core. The unique structure of the core imparts a much higher degree of opacity, possibly due to the effects of light scattering, than that possible from the use of an opacifying pigment alone. However, the core of this film contains voids which weaken the film structure and seal seam strength.

Similarly, U.S. Pat. No. 4,632,869 discloses an opaque, biaxially oriented film structure with a polymer matrix containing a strata of voids in the core. The structure may also include thermoplastic skin layers and from about 1% to 3% by weight of titanium dioxide (TiO2) or other colored oxides for color. The film has weakened strength due to voids in the core.

U.S. Pat. No. 4,741,950 discloses a differential opaque polymer film with a core layer containing numerous microscopic voids, a rough-appearing wettable first skin layer which contains an antiblocking agent such as silica, silicate, clay, diatomaceous earth, talc and glass, and a second wettable skin layer with a smooth appearance which may be metallized. Titanium dioxide may be present in the core. Among other shortcomings, this patent uses an opacifying pigment in the core which leads to contamination of equipment used in the printing of the film. When the equipment used in the manufacturing process is contaminated, great expense in the cleaning process is incurred.

Similar contamination occurs when the opacifying agent is disposed in the outer layer of the film. For example, U.S. Pat. No. 5,425,996 places the opacifying pigment in the outer layer of opaque polymer films. This design also leads to contamination of equipment used in the printing of film.

Thickness of the film is also important for film structure and seal seam strength. U.S. Pat. No. 5,716,698 discloses a peelable, oriented, opaque, multi layer polyolefin film having at least one opaque layer. All layers of the film are essentially vacuole-free for easy pealability that does not destroy the film.

U.S. Pat. No. 5,443,915 discloses an oriented, polyolefin film with a white-opaque cold seal receptive skin layer on one side of the core and a vacuumed deposited metal layer on the other side of the core. The cold receptive polyolefin layer contains a slip agent and 10% to 40% by weight of titanium dioxide. The core is substantially free of opacifying fillers and voids. One disadvantage of this invention is that the white-opaque cold seal receptive skin layer is not designed for heat sealing. The thickness of the film is about 0.2 mil. which lends itself to poor machinability and film strength.

Despite these advances in the art, a need still exists for an oriented multi-layer opaque polymer film that can economically be made with high opacity that provides improved processing characteristics such as heat sealing and machinability. There is a need for opaque polymer film that provides high whiteness, strength and stiffness that also does not contaminate equipment used in laminating and/or packaging of films.

SUMMARY OF THE INVENTION

The present invention, which addresses the needs of the prior art, is directed to an oriented multi-layer polymer film including a core made of a thermoplastic polyolefin matrix material. This core is substantially free of cavitations, voids and fillers. The oriented multi-layer polymer film of the present invention has at least one opaque thermoplastic polymer layer on at least one side of the core. This opaque thermoplastic polymer layer contains an opacifying pigment. The oriented multi-layer polymer film of the present invention has a thickness from about 0.45 mil. (gauge) to about 2 mil. (gauge) and at least one thermoplastic polymer skin layer on an outermost side of at least one opaque layer or the core. Accordingly, the present invention provides a film that does not contaminate equipment used in laminating and/or packaging of polymer films.

In addition, the polyolefin material used in the thermoplastic polyolefin matrix, as well as the opaque thermoplastic polymer layer, and the thermoplastic polymer skin layer can be materials and mixtures of olefinic homo-, co-, or terpolymers of propylene, polypropylene, isotactic polypropylene, high density polyethylene (HDPE), high density polypropylene, linear low density polyethylene, propylene, butylene, ethylene, and butene.

In one exemplary embodiment, the oriented multi-layer polymer film includes a core with two layers of polypropylene (PP), and an opaque thermoplastic polymer layer of polypropylene (PP) and titanium dioxide. Titanium dioxide is present in an amount from about 0.5% to about 40% by weight based on the weight of the opaque thermoplastic polymer layer. In addition, the thermoplastic polymer skin layer includes high density polyethylene (HDPE) and a second thermoplastic polymer skin layer of ethylene-propylene-butylene (EPB) terpolymer on at least one side of the opaque thermoplastic polymer skin layer.

The oriented multi-layer polymer film includes at least one heat sealable thermoplastic polymer skin layer outermost on one or both sides of the film. An advantage to this structure is that the film can easily be heat sealed.

As a result of the present invention, a significant white-opaque appearance is provided when titanium dioxide is used as the opacifying pigment in the opaque thermoplastic layer, up to not greater than about 40% by weight based on the weight of the opaque thermoplastic polymer skin layer. Such white coloration masks oil and grease from the baked item. This white color is enhanced when at least one thermoplastic polymer skin layer is metallized, thereby eliminating the need for white color printing of the film.

A preferred embodiment of the oriented multi-layer polymer film includes a core of polypropylene (PP), an opaque thermoplastic polymer layer of polypropylene and titanium dioxide on each side of the core. The titanium dioxide is present in an amount from about 5% to about 18% by weight based on the weight of the opaque thermoplastic polymer skin layer. A thermoplastic polymer skin layer of high density polyethylene (HDPE) on at least one side of the opaque thermoplastic polymer layer and a second thermoplastic polymer skin layer of ethylene-propylene-butylene (EPB) on at least one side of the opaque thermoplastic polymer layer. These additional layers allow for a lower amount of opacifying pigment to be used in the oriented multi-layer polymer film. Accordingly, a more economical oriented multi-layer polymer film can be produced.

Additionally, the oriented multi-layer polymer film of the present invention contains an anti-blocking agent and an anti-static agent which allows easy machinability of the film.

Other improvements which the present invention provides over the prior art will be identified as a result of the following description which sets forth the preferred embodiments of the present invention. The description is not in any way intended to limit the scope of the present invention, but rather only to provide a working example of the present preferred embodiments. The scope of the present invention will be pointed out in the appended claims.

BRIEF DESCRIPTION OF THE DRAWINGS

Preferred embodiments of the invention have been chosen for purposes of illustration and description, but are not intended in anyway to restrict the scope of the invention. The preferred embodiments of certain aspects of the invention are shown in the accompanying drawings, wherein:

FIG. 1 shows a cross-sectional view of one embodiment of the multi-layer polymer film of the present invention.

FIG. 2 shows a cross-sectional view of a second embodiment of the multi-layer polymer film of the present invention.

DETAILED DESCRIPTION OF THE INVENTION

The Core

The core of the oriented multi-layer polymer film includes a thermoplastic polyolefin matrix material which is transparent, substantially free of fillers and voids such as those caused by cavitation or expansion that produce opaqueness. Voids in the thermoplastic polyolefin matrix material are formed when olefin polymers as well as other organic and inorganic materials are phase distinct from the polymer matrix and cause the formation of an unfilled space in the polymer matrix upon orientation and extrusion. These voids decrease the mechanical properties of the film as well as stiffness and tensile strength.

Generally, the thermoplastic polyolefin matrix material in the core contains isotactic polypropylene; high density polyethylene (HDPE); linear low polyethylene; homo-, co-, and terpolymers of propylene, butylene, ethylene and butene; and mixtures thereof. Any of these polyolefin materials are suitable for the core.

In one embodiment of the present invention, the core comprises polypropylene and contains at least about 80% and preferably at least 90% to 100% by weight of isotactic polypropylene units. A preferred core has two layers, the combined polypropylene content of the two layers is from at least about 70% to about 99%, preferably about 84% by weight of the total weight of the film. A commercially available material of this description is Escorene PD as manufactured by Exxon Corporation.

Another illustrative embodiment of the present invention includes a core composition of polypropylene having 95% to 100% by weight of isotactic polypropylene units. The polypropylene content in the core is from about 78% to about 84% by weight of the total weight of the film.

Since opacifying pigments are not used in the core, contamination of equipment in the processing of film, as well as great expense in cleaning machines used in the manufacturing process is obviated.

The thickness of the core can vary over a wide range such as from about 0.4 to about 1.2 mil., preferably from about 0.5 to about 0.8 mil. and most preferably, about 0.5 mil. A most preferred core is about 0.5 mil. in thickness and has a polyolefin composition of about 72% to about 74% of isotactic polypropylene homopolymer. This results in film having excellent mechanical properties such as high stiffness and tensile strength as compared to conventional polyolefin films.

Opaque Thermoplastic Polymer Layer

The oriented multi-layer polymer film of the present invention has at least one opaque thermoplastic polymer layer on at least one side of the core. The thermoplastic polymer layer contains an opacifying pigment.

Preferably, the opaque thermoplastic polymer layer should be substantially free of voids such as those caused by cavitation or expansion. Voids in the opaque thermoplastic polymer layer decrease mechanical properties of the film as well as stiffness and tensile strength.

Any polyolefin material is suitable for the opaque thermoplastic layer. Polypropylene; high density polyethylene (HDPE); isotactic polypropylene, linear low density polyethylene; homo-, co-, and terpolymers of propylene, butylene, ethylene, and butene; and mixtures thereof can be used in this layer.

In addition, the opaque thermoplastic polymer layer contains an opacifying pigment intimately admixed in this layer. The opacifying pigment content in the opaque thermoplastic polymer layer is up to not greater than about 40% by weight of the weight of the opaque thermoplastic polymer layer, preferably from about 0.5% to 40%.

Opacifying pigments which may be used include, aluminum, titanium dioxide and talc. A preferred embodiment of the oriented multi-layer polymer film includes two opaque thermoplastic polymer layers, each layer on opposite sides of the core. Each opaque thermoplastic polymer layer contains at least about 95% by weight of polypropylene and about 5% by weight of titanium dioxide. Each opaque thermoplastic polymer layer is from about 5% to about 8% by weight of the total weight of the film.

Additional opaque layers allow for a lower amount of opacifying pigment to be used in the oriented multi-layer polymer film. The opacifying pigment in the film is present from about 0.5% to about 1.8% by weight based on the weight of the film. Accordingly, a more economical oriented multi-layer polymer film can be produced.

In another preferred embodiment, the opaque thermoplastic polymer layer is on the core and includes at least about 82% by weight of polypropylene and at least about 18% by weight of titanium dioxide. The opaque thermoplastic polymer layer is at least about 10% by weight of the total weight of the film. A commercially available material of this description is Escorene PD as manufactured by Exxon Corporation.

Opaque thermoplastic polymer layers of the present invention are inherently white and opaque. This white color is enhanced when the thermoplastic skin layer is metallized. The resulting film can have a rich high quality appearance and excellent opacifying characteristics. Multi-layer polymer films of the present invention are ideally suited for packaging food products. The film also has attractive utility as a decorative wrap material.

The thickness of the opaque thermoplastic polymer layer can vary over a wide range such as from about 0.03 mil. to about 0.2 mil., preferably from about 0.05 mil. to about 0.1 mil., and most preferably about 0.07 mil.

Optionally, the opaque layer and the thermoplastic polymer skin layer will contain an antistatic agent in a quantity sufficient to inhibit the build up of static electricity, which can occur during corona treatment of the film. Such quantity of antistatic agent can vary over a wide range, from about 0.01 to 0.1% by weight of the opaque layer.

Conventional antistatic agents suitable for the present invention are fatty acid esters and amides of fatty acids having from about 12 to 20 carbon atoms such as those of glycols, and glycerine e.g., glycerol monostearate.

The opaque thermoplastic polymer layer and thermoplastic polymer skin layer can also contain an effective amount of a slip agent, also referred to herein as anti-blocking agent, to improve the mechanical properties of the surface of the film. Generally, it is desirable to reduce the slip to a coefficient of friction (COF) of not more than about 0.4. Using a slip agent prevents blocking of adjacent layers of film on mill rolls and aids in the unwinding process.

The amount of the slip agent in the opaque thermoplastic polymer layer or thermoplastic polymer skin layer is that amount sufficient to prevent blocking and to provide good machinability. Preferable quantities of slip or anti-blocking agents normally used in the film layer can vary from about 0.01% to 1% by weight of the layer.

Examples of slip agents are cross-linked silicone such as Tospearl of Toshiba Silicone Co., Ltd., silica, silicates such as magnesium silicate, clay such as kaolin, diatomaceous earth, talc, glass beads, calcium carbonate, and the like. Such solid slip agents are generally provided in the form of approximately spheroidal particles having a particle size range of from about 0.5 to about 10 microns.

Thermoplastic Polymer Skin Layer

The oriented multi-layer polymer film of the present invention has at least one thermoplastic polymer skin layer on at least one outermost side of one of the opaque thermoplastic polymer layer or the core.

The thermoplastic polymer skin layer includes a thermoplastic polyolefin material which like the core is substantially free of fillers and voids such as those caused by cavitation or expansion which produce opaqueness.

Generally, the thermoplastic polyolefin material in the thermoplastic polymer skin layer contains, polypropylene; high density polyethylene (HDPE); isotactic polypropylene, linear low density polyethylene; homo-, co-, and terpolymers of propylene, butylene, ethylene, and butene; and mixtures thereof. Any of these polyolefin materials are suitable for the skin layer.

In one embodiment of the present invention, the oriented multi-layer polymer film includes two thermoplastic polymer skin layers, one layer on one outer most side of the core and the other thermoplastic polymer skin layer on one outermost side of the opaque layer.

One of the thermoplastic polymer skin layer includes about 100% of ethylene-propylene-butylene (EPB) terpolymer and contains from about 1% to about 4% ethylene content by weight of the skin layer, preferably 2% by weight of ethylene, and from about 80% to about 95% propylene content by weight of the skin layer, most preferably 83% propylene by weight. The percentage by weight of butylene content in this layer is from about 4% to about 15%, most preferably, 15% butylene by weight of the skin layer. A commercially available material of this description is PolyPro as manufactured by Chisso Corporation. EPB terpolymer has a melting point at or above 120°C. which makes this layer preferred for the heat sealing process.

Illustratively, the EPB terpolymer content in the thermoplastic polymer skin layer is from about 1% to about 5% by weight, preferably 3% by weight of the total weight of the film.

The other thermoplastic polymer skin layer includes about 100% high density polyethylene (HDPE) and contains from about 90% to about 100% polyethylene content by weight of this skin layer, preferably 100% by weight of polyethylene. A commercially available material of this description is Escorene HD as manufactured by Exxon Corporation.

Preferably, the HDPE content in the thermoplastic polymer skin layer includes from about 1% to about 5% by weight, preferably 3% by weight of the total weight of the film.

Optionally, the thermoplastic polymer skin layer of HDPE is metallized with aluminum using conventional vacuum deposition techniques. A rich white color results when the thermoplastic polymer skin layer is metallized, eliminating the need for white color printing of the film.

The thickness of the thermoplastic polymer skin layer can vary over a wide range such as from about 0.02 mil. to about 0.2 mil., preferably from about 0.02 mil. to about 0.1 mil. and most preferably from about 0.05 mil. to about 0.06 mil. Usually the film of the present invention has a total thickness ranging from about 0.45 mil. to about 2 mil., more specifically from about 0.7 mil. to about 1.0 mil.

The thickness relationship of the layers can be important. In particular, the core layer is relatively thick and constitutes about 50% to about 75% of the total film thickness. Accordingly, the opaque layer has a thickness ranging from about 5% to about 15% of the total film thickness, while the thermoplastic polymer skin layer thickness ranges from about 1% to about 10% of the total film thickness.

Oriented multi-layer polymer films made in accordance with the present invention have excellent mechanical properties as a result of the film thickness, including high stiffness and tensile strength as compared to conventional polyolefin films.

Manufacturing of the Film

Manufacturing of the film is carried out by known coextrusion processes. These include coextruding through a flat film die, the melt corresponding to the individual layers of the film, cooling the film obtained by coextrusion in order to harden it, orienting, e.g. biaxially stretching, the film, heat-setting the stretched film and flame treating the thermoplastic polymer skin layer and generally the opaque thermoplastic polymer layer. The film can also be made by the blown film or double bubble orientation process.

Preferably, the opaque thermoplastic polymer layer and then the thermoplastic polymer skin layer are coextruded on to a bulk core of a conventional, non-pigmented, noncavitated and non-expanded polyolefin matrix material. The coextrusion can be on opposite sides of the core.

Compositions of the opaque thermoplastic polymer layer are preferably produced employing the masterbatch method, e.g., the titanium dioxide or other opacifying pigment is first intimately dispersed with the polyolefin polymer, then mixed in with the remaining ingredients of the thermoplastic polymer skin layer.

The film structure including the core and adherent layers is stretched by conventional techniques to orient the film, prior to flame treatment. Orientation may be effected uniaxially, by stretching the film in one direction or biaxially, by stretching the film in each of two mutually perpendicular directions in the plane of the film. Biaxial orientation is preferred.

The degree to which the film is stretched depends to some extent on the ultimate use for which the film is intended. Preferably, the film is stretched to between about 4 to 6.5 times its original dimension in the longitudinal direction and about 5 to 10 times in the transverse direction. The longitudinal stretching is expeditiously carried out with the aid of two rolls running at different speeds according to the stretch ratio desired and the transverse stretching with the aid of a corresponding tenter frame.

After stretching, the polymeric film is normally "heat set", while restrained against shrinkage at a temperature above the glass transition temperature of the polymer and below its melting point.

Metallization of the thermoplastic polymer skin layer is done by treating an exposed surface thereof with a physical surface-modifying treatment to improve the bond between that surface and the subsequently applied metal. A preferred treatment process is flame treatment.

Deposition of the metal onto the thermoplastic polymer skin layer may be effected by conventional metallizing techniques disclosed in U.S. Pat. No. 4,345,005 incorporated herein by reference. Preferably, a vacuum deposition process in which the metal is evaporated on to the HDPE polyolefin surface in a chamber maintained under conditions of high vacuum. Suitable metals include nickel, copper, silver, gold, zinc, and preferably aluminum.

After metallization, the composite film which has been produced in this manner is wound up in the customary manner with the aid of a wind-up unit. Preferred films of this invention can have tensile strengths of about 19,000 psi in the machine direction and 38,000 psi in the transverse direction.

Additives

In order to modify or enhance certain properties of the multi-layer films of the invention for specific end-uses, it is possible for one or more of the layers to contain appropriate additives in effective amounts. Preferred additives include finely divided inorganic materials such as antistatic agents, antiblocking agents, lubricants, and stabilizers. Such additives are further described in U.S. Pat. No. 5,254,394.

Typically, additives are dispersed in the resin by a commercially available intensive mixer, such as those of the Bolling or Banbury type. These mixers are to be employed in mixing a concentrate of finely divided inorganic material and the selected polymer until there is a uniform dispersion of the inorganic material in the polymer.

Surface Treatment

One or more of the exposed layers of the multi-layer film can be surface-treated to render the films receptive to adhesives and/or coatings. The surface treatment can be carried out by any method known in the art such as corona discharge treatment or flame treatment.

Coating

Optionally a coating may be applied to the exposed surface of the outermost layer of the film. Prior to application of the coating material, the film may be surface treated or may be primed with a primer layer. Appropriate coatings contemplated include acrylic coatings such as those described in U.S. Pat. Nos. 3,753,769 and 4,865,908, polyvinylidene chloride (PVDC) coatings such as described in U.S. Pat. Nos. 4,214,039; 4,447,494; 4,961,992; 5,019,447 and 5,057,177.

FIG. 1 illustrates the oriented multi-layer polymer film of the present invention. Layer 10 and layer 18 represent the thermoplastic polymer skin layers. Layer 12 is the opaque thermoplastic polymer layer consisting of an opacifying pigment intimately admixed therein. The core has two layers 14 and layer 16.

FIG. 2 illustrates a second embodiment of the oriented multi-layer polymer film. Layers 10 and 18 are the thermoplastic polymer skin layers. Layer 14 is the core. Layers 12 and 15 are the opaque thermoplastic polymer layers with an opacifying pigment intimately admixed therein.

Physical properties of films made in accordance with this invention including composition, thickness and light transmission are given in the following examples. The films were all made using the method described above.

EXAMPLE 1

An extrusion coated biaxially oriented multi-layer film structure, shown in FIG. 1, was prepared having a core of polypropylene (PP) as the thermoplastic polyolefin matrix material. Core layer 14 contains about 74% PP by weight of the total weight of the film and core layer 16 contains about 10% PP by weight of the total weight of the film. One opaque thermoplastic polymer layer 12 is coextruded on one side of the core. The opaque thermoplastic polymer layer contains about 82% PP and about 18% titanium dioxide by weight of the total weight of the opaque layer. Opaque thermoplastic polymer layer 12 represents from about 10% by weight of the total weight of the film. Coextruded on layer 16 is one thermoplastic polymer skin layer 18 of ethylene-propylene-butylene (EPB) terpolymer. As discussed earlier, EPB terpolymer is ideal for heat sealing. On opaque thermoplastic polymer layer 12, is coextruded second thermoplastic polymer skin layer of HDPE representing from about 3% by weight of the total weight of the film. HDPE is ideal for metallization.

The total thickness of the film is about 1 mil. Titanium dioxide content in the total structure is about 1.8% of the total weight of the film. Light transmission of the film is about 55%. The resulting film in Example 1 may optionally be metallized on layer 10 with aluminum using conventional vacuum deposition techniques. Appearance of the film when viewed with an aluminum metallized layer is white.

EXAMPLE 2

In this Example, the multi layer film structure of the present invention is made by coextrusion of the five layers shown in FIG. 2. Thermoplastic polyolefin matrix material in the core is about 78% to about 84% PP by weight of the total weight of the film. On opposite sides of core 14, are opaque thermoplastic polymer layers 12 and 15 which consist of titanium dioxide intimately dispersed in PP for each layer. Titanium dioxide content in each opaque thermoplastic polymer layer is about 5% by weight of the total weight of each opaque thermoplastic polymer layer. Coextruded on layer 12 and layer 15 are two thermoplastic polymer skin layers 10 and 18. Thermoplastic polymer layer 10 consists of HDPE and represents about 3% of the total weight of the film. This layer can be easily metallized using conventional vapor deposition techniques. Thermoplastic polymer layer 18 is coextruded on layer 15 and consists of EPB terpolymer and represents about 3% by weight of the total weight of the film. The EPB terpolymer layer is ideal for heat sealing. The total thickness of the film is about 0.9 mil. Titanium dioxide content in the film is relatively low and from about 0.5% to about 0.8% of the total weight of the film. Light transmission of the film is about 80%. The resulting film in Example 2 may optionally be metallized on layer 10 with aluminum using conventional vacuum deposition techniques. Appearance of the film when viewed with an aluminum metallized layer is a slight silver cast.

While there have been described what are presently believed to be the preferred embodiments of the invention, those skilled in the art will realize that various changes and modifications may be made to the invention without departing from the spirit of such invention. All such changes and modifications which fall within the scope of the invention are therefore intended to be claimed.

What is claimed is:

1. A multi-layer film comprising:
   a core comprising a thermoplastic polyolefin matrix material, said core being substantially free of cavitations, voids, pigments, and fillers, wherein said core comprises about 75% to about 99% by weight of the total weight of the film;
   at least one opaque thermoplastic polymer layer containing an opacifying pigment on at least one side of said core;
   at least one thermoplastic polymer skin layer on an outermost side of said at least one opaque layer; and said oriented multi-layer polymer film having a thickness from about 0.450 mil. to about 2 mil.

2. The oriented multi-layer polymer film of claim 1, wherein said thermoplastic polyolefin matrix material comprises a material selected from the group consisting of polypropylene; high density polyethylene (HDPE); isotactic polypropylene, linear low density polyethylene; homo-, co-, or terpolymers of propylene, butylene, ethylene, and butene; and mixtures thereof.

3. The oriented multi-layer polymer film of claim 1, wherein each opaque thermoplastic polymer layer and said thermoplastic polymer skin layer comprises a material selected from the group consisting of polypropylene; high density polyethylene (HDPE); isotactic polypropylene; linear low density polyethylene; homo-, co-, terpolymers of propylene, butylene, ethylene and butene; and mixtures thereof.

4. The oriented multi-layer polymer film of claim 1, wherein there is a heat sealable thermoplastic polymer skin layer outermost on one or both sides of the film.

5. The oriented multi-layer polymer film of claim 1, wherein said opacifying pigment is up to not greater than about 40% titanium dioxide by weight based on the weight of said opaque thermoplastic polymer layer.

6. The oriented multi-layer polymer film of claim 1, wherein at least one of said thermoplastic polymer skin layer is metallized.

7. The oriented multi-layer polymer film of claim 1, wherein said core comprises polypropylene (PP), said opaque thermoplastic polymer layer comprises polypropylene and from about 5% to about 18% titanium dioxide by weight based on the weight of said opaque thermoplastic polymer layer; said thermoplastic polymer skin layer comprises high density polyethylene (HDPE) and is on an outermost side of said core; and further comprising a second thermoplastic polymer skin layer which comprises a terpolymer of ethylene-propylene-butylene (EPB) and is on an outermost side of said opaque thermoplastic polymer layer.

8. The oriented multi-layer polymer film of claim 1, which further comprises an anti-blocking agent and an anti-static agent contained therein.

9. The oriented multi-layer polymer film of claim 1 containing from about 0.5% to about 1.8% titanium dioxide by weight based on the weight of said film.

10. The oriented multi-layer polymer film of claim 1 further comprising:
    a second opaque thermoplastic polymer layer containing an opacifying pigment having a first side and a second side wherein the second side of the second opaque layer is adjacent to the first side of the core layer wherein said second opaque layer is substantially free of voids;
    a second thermoplastic polymer skin layer having a first side and a second side wherein the second side of the second skin layer is adjacent to the first side of the second opaque layer.

11. A multi-layer film comprising:
    a core comprising a thermoplastic polyolefin matrix material, said core being substantially free of cavitations, voids, pigments, and fillers, wherein said core has a first side and a second side;
    a first opaque thermoplastic polymer layer comprising an opacifying pigment exterior to the first side of the core;
    a first thermoplastic polymer skin layer exterior to said first opaque thermoplastic polymer layer;
    a second thermoplastic polymer layer exterior to the second side of the core; and
    a second thermoplastic polymer skin layer exterior to said second thermoplastic polymer layer.

12. The multi-layer film of claim 11 wherein said core comprises at least about 75% to about 99% by weight of the total weight of the film.

13. The multi-layer film of claim 11 wherein said second thermoplastic polymer layer comprises an opacifying pigment.

14. The multi-layer film of claim 12 wherein said second thermoplastic polymer layer comprises an opacifying pigment.

* * * * *